Feb. 8, 1966 N. W. LYNN 3,233,316
APPARATUS FOR FABRICATING RUBBER MATS
Filed Nov. 20, 1962 2 Sheets-Sheet 1
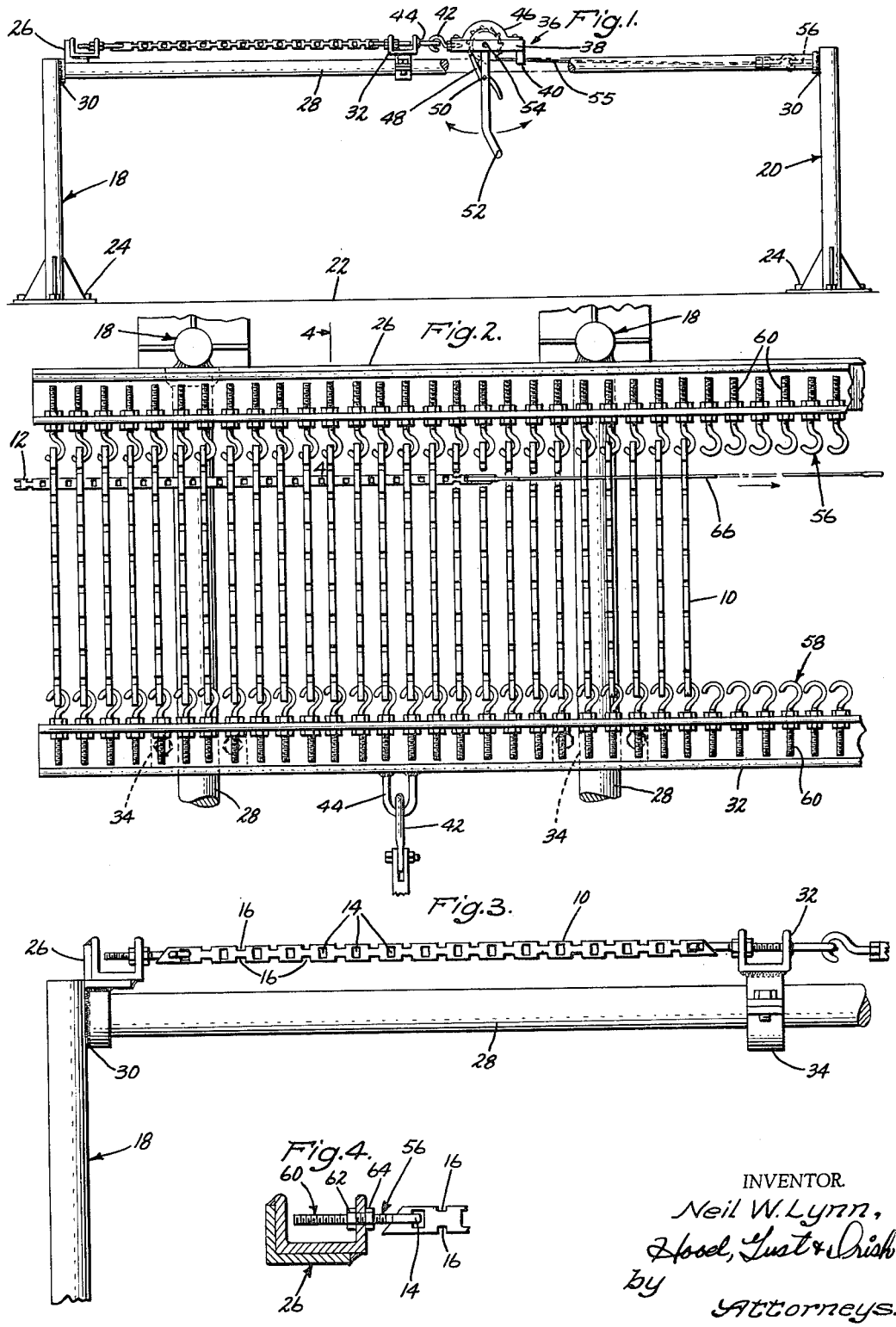
INVENTOR.
Neil W. Lynn,
Hood, Gust & Irish
by
Attorneys.

Feb. 8, 1966  N. W. LYNN  3,233,316
APPARATUS FOR FABRICATING RUBBER MATS
Filed Nov. 20, 1962  2 Sheets-Sheet 2
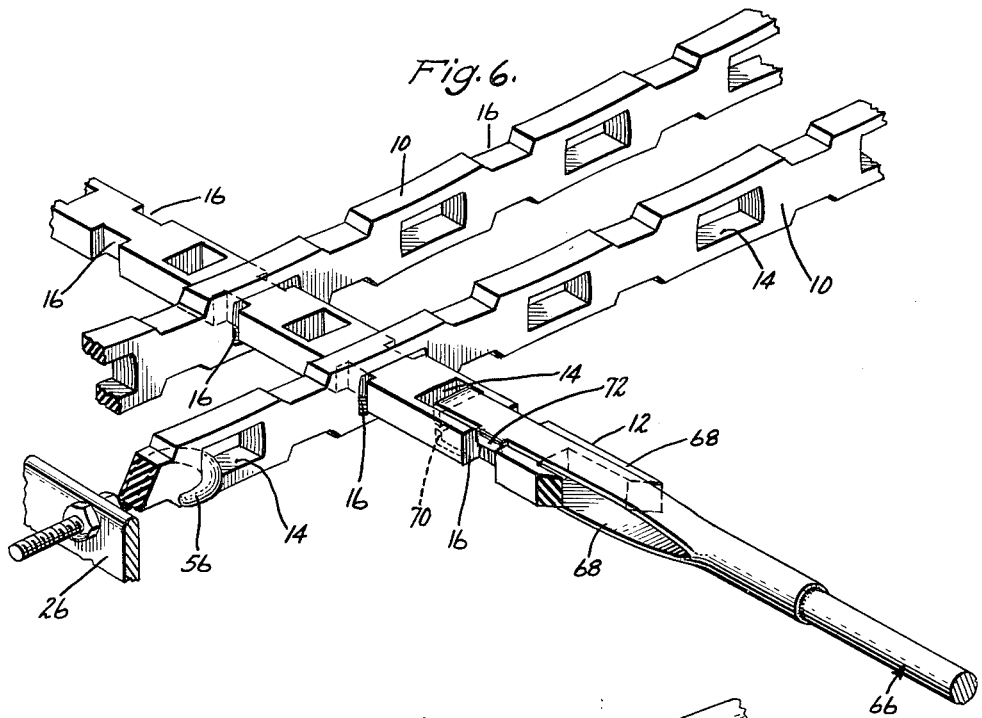
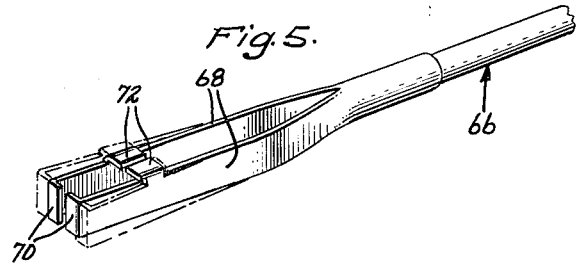
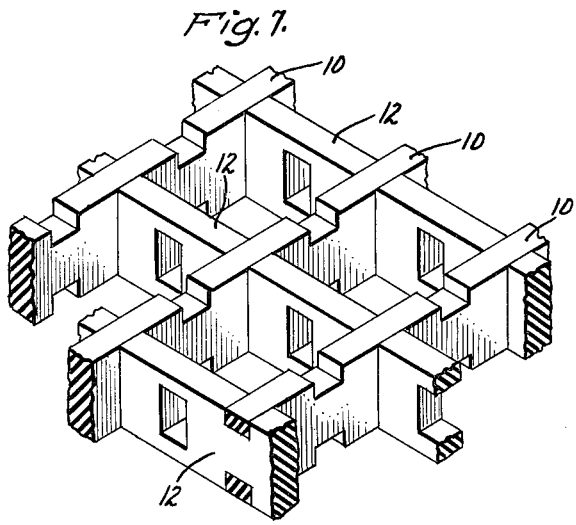
INVENTOR.
Neil W. Lynn,
by Hood, Gust & Dish
Attorneys.

United States Patent Office 3,233,316
Patented Feb. 8, 1966

3,233,316
APPARATUS FOR FABRICATING RUBBER MATS
Neil W. Lynn, 802 Van Buren St., Fort Wayne, Ind.
Filed Nov. 20, 1962, Ser. No. 239,410
6 Claims. (Cl. 29—241)

The present invention relates to an apparatus for fabricating rubber mats and more particularly to an apparatus for assembling, in interlocking relationships, a plurality of transversely extending rubber strips.

In one design of rubber mats, two sets of orthogonally related rubber strips are interlocked into an integrated mat structure which cannot be accidentally dismantled through handling or ordinary usage. One set of these strips is provided with a series of equally spaced apertures while the other set is provided with a series of equally spaced edge notches. The strips having the notches are fitted into the aligned apertures of the other strips such that the notches and apertures are in registry. So related, the notches engage the sides of the apertured strips and the apertures intimately engage that portion of the notched strips between the notches. By this means, the strips are interlocked into a tightly fitting, integrated mat.

In the assembly of the strips, one method involves the stretching of the apertured strips so as to elongate the apertures therein, following which the notched strips are passed through the elongated apertures to a point at which the notches come into registry with the apertures. The notched strips are thereupon rotated 90° and the stretched strips are released allowing the apertures to close onto the notched strips.

It is, therefore, an object of this invention to provide an apparatus whereby a plurality of strips may be handled simultaneously in a facile manner for assembling notched strips to apertured strips.

It is another object of this invention to provide an appartus wherein a plurality of apertured strips may be properly supported with respect to each other and also stretched while in this condition such that another strip can be easily passed through the apertures and properly located with respect to the apertured strips.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation of one embodiment of this invention with a plurality of rubber strips in position for mat fabrication;

FIG. 2 is a fragmentary, top plan view of the apparatus of FIG. 1 showing the rubber strips in position;

FIG. 3 is an enlarged fragmentary side elevation of the appartus of FIG. 1;

FIG. 4 is an enlarged cross-sectional illustration of the rigid supporting bar of the apparatus for drawing figures;

FIG. 5 is a fragmentary perspective illustration of the end portion of the needle shown in FIG. 2;

FIG. 6 is a enlarged perspective illustration of two rubber strips in stretched condition and a third strip being inserted through two aligned apertures in the stretched strips; and FIG. 7 is a fragmentary perspective illustration of a finished mat structure.

Referring to the drawings, and more particularly to FIGS. 3 and 7, a rubber mat as shown in FIG. 7 is composed of a plurality of elongated rubber strips 10 and 12 which may be of identical size, shape and design. The material of these strips is preferably butyl rubber. As an example of the configuration of these strips, reference may be had to FIG. 3 where one such strip is shown in unstretched condition. A description of this one strip will suffice for all.

The strip is provided with a plurality of equally spaced, rectangular apertures 14 as well as a series of equally spaced notch pairs 16, the latter being located midway between adjacent apertures 14. The apertures 14 in size and shape are made to conform substantially to that portion of the strip between a pair of notches 16 such that when this portion is inserted into a given notch 14, it will be frictionally gripped and held in position. The notches 16 are made to a width which is substantially equal to or slightly smaller than the thickness of the strip 10, 12 for a purpose which will become apparent from the following description.

As shown in FIG. 7, a plurality of strips 12 are passed through respective aligned apertures in a plurality of strips 10 such that the two different sets of strips are interlocked in orthogonal relationship. Further elaboration and description of a mat of the character shown in FIG. 7 is found in Moeckel application Serial No. 156,383, filed December 1, 1961, now Patent No. 3,156,-957, and entitled "Floor Mat and Method of Making the Same," and also Lynn application Serial No. 239,033, filed November 20, 1962, and entitled "Floor Mat." The disclosure found in these two prior applications may be regarded as being incorporated herein.

Referring to FIGS. 1-4, the apparatus there disclosed comprises four upstanding posts 18 and 20 which are preferably fixedly secured to a floor 22 by means of suitable fasteners such as screws or bolts 24. These posts 18 and 20 may be regarded in pairs, two posts 18 (FIG. 2) constituting one pair and two posts 20 as another pair. The posts are spaced apart as shown and are made of suitably strong metal bar or conduit stock.

To the upper ends of the two posts 18 is secured by means of welding or the like a horizontally extending elongated rigid bar 26 which, in a working embodiment of this invention, may be a channel iron having the configuration in cross-section as shown in FIG. 4. Secured at 30 by welding or the like, between pairs of upstanding posts 18 and 20, are two spaced apart, horizontally extending, rigid guide rods 28. As shown more clearly in FIGS. 1 and 3, the channel shaped bar 26 may be mounted on the left-hand end portions of the guide rods 28 as viewed in FIGS. 1 and 3. The posts 18, 20, the channel-shaped bar 26, and the two guide rods 28 being so rigidly secured together may be regarded as a self-supporting, rigid frame.

A movable, horizontally extending, elongated, rigid bar 32, which may be constructed substantially identically to the bar 26, overlies the guide rods 28 at right angles thereto. Also, this bar 32 is horizontally spaced from and is parallel to the other bar 26.

A pair of bearings 34 are secured to the underside of the bar 32 in spaced-apart relationship and are fitted around the two rods 28 for longitudinal sliding movement on the latter. These bearings 34 may be of any conventional construction, the primary purpose thereof being to mount the bar 32 for sliding movement on the rods 28 and also to maintain the bar 32, while being moved, at substantially right angles to the rods 28.

Also mounted for sliding movement on the two guide rods 28 is a conventional winch, which is indicated generally by the reference numeral 36. This winch comprises a frame 38 having two part-cylindrical portions 40 which are spaced apart to slide on the upper surfaces of the two rods 28, respectively. To the left-hand end of the frame 38 as viewed in FIG. 1 is secured a suitable hook 42 which is connected to an eyelet 44 secured to the bar 32 midway between the two rods 28 (FIG. 2). A spool 46 is mounted for rotation about a horizontal axis on the frame 38 and has a ratchet wheel 47 secured thereto which is operatively engaged by a lever or pawl 48. This pawl 48 is pivotally connected at 50 to an operating handle 52 which, at its upper end, is pivotally mounted on the shaft 54 which mounts the spool 46 on the frame 38.

A cable 54 is partially wound around the spool 46 and is secured at one end thereto. The other end of the cable 54 extends toward the right as viewed in FIG. 1 and is connected to a suitable frame bar 56 which extends between the two rear posts 20.

By rotating the spool 46 in a direction to wind the cable 54 thereon, the winch 36 will be drawn toward the right as viewed in FIG. 1 and will move the bar 32 therewith. Rotation of the spool 46 is effected by operation of the handle 52 which in turn engages the pawl 48 with the ratchet wheel 47. As shown in the drawings, leftward movement of the handle 52 serves to swing the upper end of the pawl 48 in an upward direction, thereby turning the ratchet wheel 47 clockwise by reason of the engagement of this upper pawl end with the ratchet teeth. A suitable spring connected between the upper end portion of the pawl and the adjacent portion of the handle 52 urges the pawl 48 in a clockwise direction around its pivot 50 thereby always maintaining the upper end of the pawl in operative engagement with the teeth of the ratchet wheel 47. Thus, by alternate forward and rearward motions of the handle 52, the cable 54 may be wrapped onto the spool 46 for incrementally moving the right bar 32 toward the right as viewed in FIG. 1. The ratchet wheel 47 is provided with a sufficient number of ratchet teeth such that the movement of the bar 32 toward the right may be effected in incrementally small steps for a purpose which will become apparent from the following description.

The two bars 26 and 32 are provided with a multiplicity of inwardly extending hooks 56 and 58, respectively. Since these hooks 56, 58 may be identically constructed and mounted on the respective bars 26 and 32, a description of one will suffice for all. As shown more clearly in FIGS. 2, 4 and 6, these hooks 56, 58 have threaded shanks 60 which pass through companion apertures in the upstanding flanges in the bars 26, 32. These shanks are secured to the flanges by means of two nuts 62 and 64 on opposite sides of the flanges.

The hooks 56, 58 are spaced equal distances apart on the respective bars 26, 32 and are arranged flat or horizontal as shown. All of the hooks are substantially parallel and open in the same direction. Also, the hooks 56 and 58 are arranged on the respective bars 26 and 32 such that they will be directly opposite each other along lines which are parallel to the guide bars 28. The hooks preferably are of equal length measured from the bars 26 and 32.

With reference to FIGS. 2, 5 and 6, a needle used in threading the notched strips through apertures in the stretched strips is indicated by the numeral 66. On the left-hand end of this needle, which is formed of fairly rigid bar stock, is secured a yoke structure composed of two preformed, resilient fingers 68 which are spaced apart and parallel as shown. The distal ends of these fingers 68 have inturned flanges 70 which terminate just short of each other. Also, suitable ears 72 as shown laterally extend from the respective fingers 68 and project inwardly toward each other. As shown more clearly in FIG. 6, the fingers 68 are adapted to straddle the end of one rubber strip 12 so that the flanges 70 may enter an aperture 14. Also, the ears 72 are designed such that they will enter the adjacent notches 16. By this means, the needle 66 may be connected to the strip 12 for a purpose which will be explained more fully hereinafter.

In fabricating a rubber mat such as is disclosed in FIG. 7 with the apparatus described in the foregoing, a series of strips 10 are first cut to about the same length. These strips as shown in FIG. 2 are then strung between pairs of aligned hooks 56 and 58, the hooks passing through the endmost apertures 14 in the strips as shown more clearly in FIGS. 3, 4 and 6. The winch 36 is next operated to move the bar 32 away from the bar 26, thereby stretching the strips 10 and elongating the apertures 14 therein as shown more clearly in FIG. 6. These apertures 14 are elongated just sufficiently to receive the strip 12 therethrough, also as shown in FIG. 6.

Next, the needle 66 is fastened to the end of one strip 12 which is initially formed to a length about equal to the distance between the endmost strips 10 as mounted on the apparatus as shown in FIG. 2. The needle 66 is thereupon passed through an aligned series of apertures in the strips 10 as shown in FIG. 2. The attached strip 12 is thereby drawn through these apertures. When the strip 12 is pulled all the way through to the right-hand end of the series of strips 10 as shown in FIG. 2, it is adjusted longitudinally such that the notches 16 therein coincide precisely with the thicknesses of the various strips 10. The needle is detached from the strip 12 and the latter is rotated 90° such that the notches 16 straddle the sides of the strips 10.

Following this, other strips 12 are inserted in succession through the other elongated apertures in the strips 10 and rotated 90° as just explained. When all of the aligned apertures have been filled with strips 12, the winch 36 is operated such as to permit the bar 32 to move toward the bar 26, thereby removing the stretching forces from the strips 10. The strips 10 thereupon collapse around and grip the portions of the strips 12, which are between the respective notches 16. The mat of FIG. 7 is thereupon completed and may be removed from the apparatus by merely unhooking the strips 10 from the various hooks 56 and 58.

As will now be apparent, the hooks 56 and 58 are spaced apart distances which are substantially equal to the spacing between longitudinally adjacent notches 16 in the strips 10, 12. Thus, when a strip 12 is pulled all the way through a series of stretched strips 10, the notches 16 in the strip 12 will coincide precisely with the various strips 10. All that remains to be done in assembling the particular strip 12 onto the strips 10 is to rotate the strip 12 by 90°.

While a winch 36 has been disclosed as being suitable for operating the bar 32, it will be obvious that other power devices may be used instead for performing the same purpose. For example, either a hydraulic or air cylinder may be connected between the bar 32 and the right-hand end of the frame and operated such as to control the movement of the bar 32 on the guide rods 28.

While I have described above the principles of my invention in connection with specific apparatus, it is to be clearly understood that this description is made only by way of example and not as a limitation to the scope of my invention.

What is claimed is:

1. Apparatus for fabricating rubber mats comprising a rigid stationary frame having four upstanding supports which are spaced apart, said supports having upper and lower end portions, respectively, a first horizontally extending elongated rigid bar fixedly secured to the upper end portions of two of said supports, two spaced apart and parallel guide rods fixedly secured at one end to the upper end portions of said two supports and at the other end to the upper end portions of the other supports, said guide rods being horizontally disposed and extending at right angles to said rigid bar, a second horizontally extending elongated rigid bar spaced from and parallel to said first bar, said second bar overlying said two guide rods, two bearing members secured in spaced apart relation to the underside of said second bar and slidably surrounding said two guide rods, respectively, for longitudinal sliding movement thereon, a winch having a frame which is mounted for longitudinal sliding movement on said guide rods, said winch being disposed between said rods and between said second bar and said other two supports, said winch frame being connected to said second bar at a location between said guide rods, said winch further including a spool having a cable thereon which is connected at one end to said spool, the other end of said cable being operatively connected to the upper end portions of said other two supports, said winch being disposed between said second bar and said other two supports whereby it can move said second bar toward said two other bars, said winch including a ratchet operatively connected to said spool and the winch frame for locking said spool in a given position, a plurality of hook members fixedly secured to both of said bars, said hook members being spaced equal distances apart longitudinally of said bars, the hook members of one bar extending inwardly toward the hook members of the other bar, said hook members having horizontally extending bar portions which extend in a direction transversely of said guide rods, the bar portions of the hook members on the two rigid bars, respectively, thereby being adapted to have attached thereto a plurality of parallel rubber strips such that the latter extend between the hook members on the two bars, said strips having a plurality of longitudinally spaced apertures therein, the apertures of all of said strips being transversely aligned, respectively, an elongated straight needle insertable through one series of transversely aligned apertures, said needle having on one end thereof a pair of preformed resilient fingers which are spaced apart and substantially parallel, said fingers each having an inturned flange of such size as will fit into an aperture of one of said rubber strips, said fingers being preformed to position said flanges in such an aperture.

2. Apparatus for fabricating rubber mats comprising a rigid stationary frame having four upstanding supports which are spaced apart, said supports having upper and lower end portions, respectively, a first horizontally extending elongated rigid bar fixedly secured to the upper end portions of two of said supports, two spaced apart and parallel guide rods fixedly secured at one end to the upper end portions of said two supports and at the other end to the upper end portions of the other supports, said guide rods being horizontally disposed and extending at right angles to said rigid bar, a second horizontally extending elongated rigid bar spaced from and parallel to said first bar, said second bar overlying said two guide rods, two bearing members secured in spaced apart relation to the underside of said second bar and slidably surrounding said two guide rods, respectively, for longitudinal sliding movement thereon, means connected to said second bar for moving the latter on said rods in a direction away from said first bar, a plurality of hook members fixedly secured to both of said bars, said hook members being spaced equal distances apart longitudinally of said bars, the hook members of one bar extending inwardly toward the hook members of the other bar, said hook members having horizontally extending bar portions which extend in a direction transversely of said guide rods, the bar portions of the hook members on the two rigid bars, respectively, thereby being adapted to have attached thereto a plurality of parallel rubber strips such that the latter extend between the hook members on the two bars, said strips having a plurality of longitudinally spaced apertures therein, the apertures of all of said strips being transversely aligned, respectively, an elongated straight needle insertable through one series of transversely aligned apertures, said needle having on one end thereof a pair of preformed resilient fingers which are spaced apart and substantially parallel, said fingers each having an inturned flange of such size as will fit into an aperture of one of said rubber strips, said fingers being preformed to position said flanges in such an aperture.

3. Apparatus for fabricating rubber mats comprising a rigid stationary frame having four upstanding supports which are spaced apart, said supports having upper and lower end portions, respectively, a first horizontally extending elongated rigid bar fixedly secured to the upper end portions of two of said supports, two spaced apart and parallel guide rods fixedly secured at one end to the upper end portions of said two supports and at the other end to the upper end portions of the other supports, said guide rods being horizontally disposed and extending at right angles to said rigid bar, a second horizontally extending elongated rigid bar spaced from and parallel to said first bar, said second bar overlying said two guide rods, two bearing members secured in spaced apart relation to the underside of said second bar and slidably surrounding said two guide rods, respectively, for longitudinal sliding movement thereon, a winch having a frame which is mounted for longitudinal sliding movement on said guide rods, said winch being disposed between said rods and between said second bar and said other two supports, said winch frame being connected to said second bar at a location between said guide rods, said winch further including a spool having a cable thereon which is connected at one end to said spool, the other end of said cable being operatively connected to the upper end portions of said other two supports, said winch being disposed between said second bar and said other two supports whereby it can move said second bar toward said two other bars, said winch including a ratchet operatively connected to said spool and the winch frame for locking said spool in a given position, a plurality of hook members fixedly secured to both of said bars, said hook members being spaced equal distances apart longitudinally of said bars, the hook members of one bar extending inwardly toward the hook members of the other bar, said hook members having horizontally extending bar portions which extend in a direction transversely of said guide rods.

4. Apparatus for fabricating rubber mats comprising a rigid stationary frame having four upstanding supports which are spaced apart, said supports having upper and lower end portions, respectively, a first horizontally extending elongated rigid bar fixedly secured to the upper end portions of two of said supports, two spaced apart and parallel guide rods fixedly secured at one end to the upper end portions of said two supports and at the other end to the upper end portions of the other supports, said guide rods being horizontally disposed and extending at right angles to said rigid bar, a second horizontally extending elongated rigid bar spaced from and parallel to said first bar, said second bar overlying said two guide rods, two bearing members secured in spaced apart relation to the underside of said second bar and slidably surrounding said two guide rods, respectively, for longitudinal sliding movement thereon, means connected to said second bar for moving the latter on said rods in a direction away from said first bar, a plurality of hook members fixedly secured to both of said bars, said hook members being spaced equal distances apart longitudinally of said bars, the hook members of one bar extending inwardly toward the hook members of the other bar, said hook members having horizontally extending bar portions which extend in a direction transversely of said guide rods.

5. Apparatus for fabricating rubber mats comprising stationary frame means, a first horizontally extending elongated rigid bar fixedly secured to said frame means, two spaced apart and parallel guide rods fixedly mounted on said frame means and extending at right angles to said bar, a second horizontally extending elongated rigid bar spaced from and parallel to said first bar, means for slidably mounting said second bar on said guide rods whereby said second bar may be moved toward and away from said first bar, means connected to said second bar for moving the latter in a direction away from said first bar in parallelism therewith, a plurality of hook members fixedly secured to both of said bars, said hook members being spaced equal distances apart longitudinally of said bars, the hook members of one bar extending inwardly toward the hook members of the other bar, said hook members having horizontally extending bar portions which extend in a direction transversely of said guide rods.

6. Apparatus for fabricating rubber mats comprising means for holding a plurality of rubber-like strips in spaced apart parallel relationship, said strips having a plurality of equally longitudinally spaced apertures therein, means for stretching said strips and for positioning the apertures in said strips in straight transverse alignment thereby arranging said apertures into a plurality of straight transverse rows, a rigid elongated threading device insertable through one of said rows of apertures, said threading device having means for threading a rubber-like strip through the apertures of said one row.

References Cited by the Examiner
UNITED STATES PATENTS

| | | | |
|---|---|---|---|
| 69,907 | 10/1867 | Force et al. | 254—51 X |
| 1,178,410 | 4/1916 | Pence | 254—83 |
| 1,610,633 | 12/1926 | Swanson | 29—241 |
| 2,394,884 | 2/1946 | Adrias | 29—241 X |

WILLIAM FELDMAN, *Primary Examiner.*